(12) United States Patent
Araki et al.

(10) Patent No.: US 12,301,078 B2
(45) Date of Patent: May 13, 2025

(54) INSULATOR, TO BE ATTACHED TO TEETH OF A STATOR CORE IN A RADIAL DIRECTION

(71) Applicant: Toshiba Industrial Products and Systems Corporation, Kawasaki (JP)

(72) Inventors: Takashi Araki, Mie-gun (JP); Motoyasu Mochizuki, Mie-gun (JP); Masaaki Matsumoto, Mie-gun (JP)

(73) Assignee: Toshiba Industrial Products and Systems Corporation, Kawasaki (JP)

( * ) Notice: Subject to any disclaimer, the term of this patent is extended or adjusted under 35 U.S.C. 154(b) by 215 days.

(21) Appl. No.: 17/999,504

(22) PCT Filed: May 26, 2021

(86) PCT No.: PCT/JP2021/019948
§ 371 (c)(1),
(2) Date: Nov. 21, 2022

(87) PCT Pub. No.: WO2021/246257
PCT Pub. Date: Dec. 9, 2021

(65) Prior Publication Data
US 2023/0238864 A1    Jul. 27, 2023

(30) Foreign Application Priority Data
Jun. 2, 2020 (JP) .................... 2020-095961

(51) Int. Cl.
*H02K 15/095* (2006.01)
*H02K 3/52* (2006.01)

(52) U.S. Cl.
CPC ........... *H02K 15/095* (2013.01); *H02K 3/522* (2013.01); *H02K 2203/12* (2013.01)

(58) Field of Classification Search
CPC ......................... H02K 3/522; H02K 2203/12
See application file for complete search history.

(56) References Cited

U.S. PATENT DOCUMENTS

| | | | |
|---|---|---|---|
| 2003/0129856 A1* | 7/2003 | Takizawa | H02K 3/50 439/13 |
| 2006/0049704 A1* | 3/2006 | Ito | H02K 3/522 310/71 |
| 2019/0319506 A1 | 10/2019 | Reu | |

FOREIGN PATENT DOCUMENTS

| JP | 5-168187 A | 7/1993 |
|---|---|---|
| JP | 10-247533 A | 9/1998 |

(Continued)

OTHER PUBLICATIONS

JP-2011254689-A_translate (Year: 2011).*

(Continued)

*Primary Examiner* — Tulsidas C Patel
*Assistant Examiner* — Mohammed Ahmed Qureshi
(74) *Attorney, Agent, or Firm* — Oblon, McClelland, Maier & Neustadt, L.L.P.

(57) ABSTRACT

A coil-connecting method according to an embodiment includes: preparing a metal sleeve having a circular shape when viewed from an axial direction; processing the metal sleeve such that the metal sleeve has a non-circular shape when viewed from the axial direction, thereby obtaining a deformed sleeve; inserting a plurality of coils into the deformed sleeve, aligning the plurality of the coils by the deformed sleeve; and swaging the deformed sleeve after the plurality of the coils are inserted into the deformed sleeve, thereby connecting the deformed sleeve and the plurality of the coils together.

4 Claims, 4 Drawing Sheets

(56) References Cited

FOREIGN PATENT DOCUMENTS

| | | | |
|---|---|---|---|
| JP | 2003-209944 A | | 7/2003 |
| JP | 2005-278289 A | | 10/2005 |
| JP | 2006-114390 A | | 4/2006 |
| JP | 2011254689 A | * | 12/2011 |
| JP | 5986798 B | | 9/2016 |
| JP | 2017-158250 A | | 9/2017 |
| WO | WO 2018/150964 A1 | | 8/2018 |

OTHER PUBLICATIONS

International Search Report issued Aug. 17, 2021 in PCT/JP2021/019948 filed on May 26, 2021, 4 pages (with English Translation).
Extended European Search Report Issued Jun. 10, 2024 in European Application No. 21817506., 11 pages.

* cited by examiner

INSULATOR, TO BE ATTACHED TO TEETH OF A STATOR CORE IN A RADIAL DIRECTION

CROSS-REFERENCE TO RELATED APPLICATIONS

This is the U.S. National Phase Application under 35 U.S.C. § 371 of International Patent Application No. PCT/JP2021/019948 filed May 26, 2021, which designated the United States and was published in a language other than English, which claims the benefit of Japanese Patent Application No. 2020-095961 filed Jun. 2 2020, both of them are incorporated by reference herein. The International Application was published in Japanese on Dec. 9, 2021 as WO2021/246257 A1 under PCT Article 21 (2).

TECHNICAL FIELD

Embodiments of the present invention relate to a method of connecting a coil, an insulator, a stator, and a rotating electric machine.

BACKGROUND ART

As a rotating electric machine, a rotating electric machine including a stator and a rotor is known. For example, the stator includes a circular-ring-shaped stator core, teeth protruding from an inner peripheral surface of the stator core in a radially inward direction, a coil wound around the teeth, and an insulator attached to the teeth and used to ensure insulation between the teeth and the coil.

Here, as a step of connecting terminal portions of the coils each wound around the teeth, for example, a metal sleeve formed of a round tube may be used. In such a case, the terminal portions of the plurality of the coils are inserted into the metal sleeve, and the metal sleeve is swaged while maintaining a state in which the terminal portions of the plurality of the coils are inserted into the metal sleeve. Accordingly, the terminal portions of the coils are pressure-bonded to each other by the metal sleeve, and the terminal portions are connected.

However, in the case in which the shape of the coil pressure-bonded by the metal sleeve is, for example, a round wire, the direction of the coil has less effect on the metal sleeve. In contrast, in the case in which the coil is, for example, a rectangular wire, it is necessary to swage the metal sleeve in a state in which the coils are aligned. The reason for this is that, in the case of using the rectangular wire, pressure is not uniformly applied to each of the coils depending on the direction of the rectangular wire, or a direction in which the rectangular wire pressure-bonded by the metal sleeve is drawn out from the metal sleeve is limited.

However, alignment of the rectangular wire inside the metal sleeve becomes complicated, and there is a possibility that workability of an operation of connecting the coils is degraded.

Furthermore, in the case in which the terminal portions of the coils are pressure-bonded by the metal sleeve, there is a possibility that the metal sleeve comes into contact with the coil wound around the teeth depending on a portion where the metal sleeve is disposed. In the case in which the metal sleeve comes into contact with the coil, a coating of the coil is peeled off, and there is a possibility that short-circuiting between the coil and the metal sleeve occurs. In order to prevent contact or short-circuiting between the coil and the metal sleeve, it is conceivable to fix the metal sleeve by another member. However, in this case, there is a possibility that the rotating electric machine becomes larger in size.

CITATION LIST

Patent Literature

[Patent Literature 1] Japanese Unexamined Patent Application, First Publication No. 2005-278289

SUMMARY OF THE INVENTION

Problems to be Solved by the Invention

The invention that solves the problem provides a method of connecting a coil, an insulator, a stator, and a rotating electric machine which can improve workability of an operation of connecting the coils, can prevent short-circuiting of the coils, and can suppress an increase in size of an apparatus.

Means for Solving the Problems

A coil-connecting method according to an embodiment includes: preparing a metal sleeve having a circular shape when viewed from an axial direction; processing the metal sleeve such that the metal sleeve has a non-circular shape when viewed from the axial direction, thereby obtaining a deformed sleeve; inserting a plurality of coils into the deformed sleeve, aligning the plurality of the coils by the deformed sleeve; and swaging the deformed sleeve after the plurality of the coils are inserted into the deformed sleeve, thereby connecting the deformed sleeve and the plurality of the coils together.

EMBODIMENTS FOR CARRYING OUT THE INVENTION

Hereinafter, a rotating electric machine according to an embodiment will be described with reference to the drawings.

Figure 1:
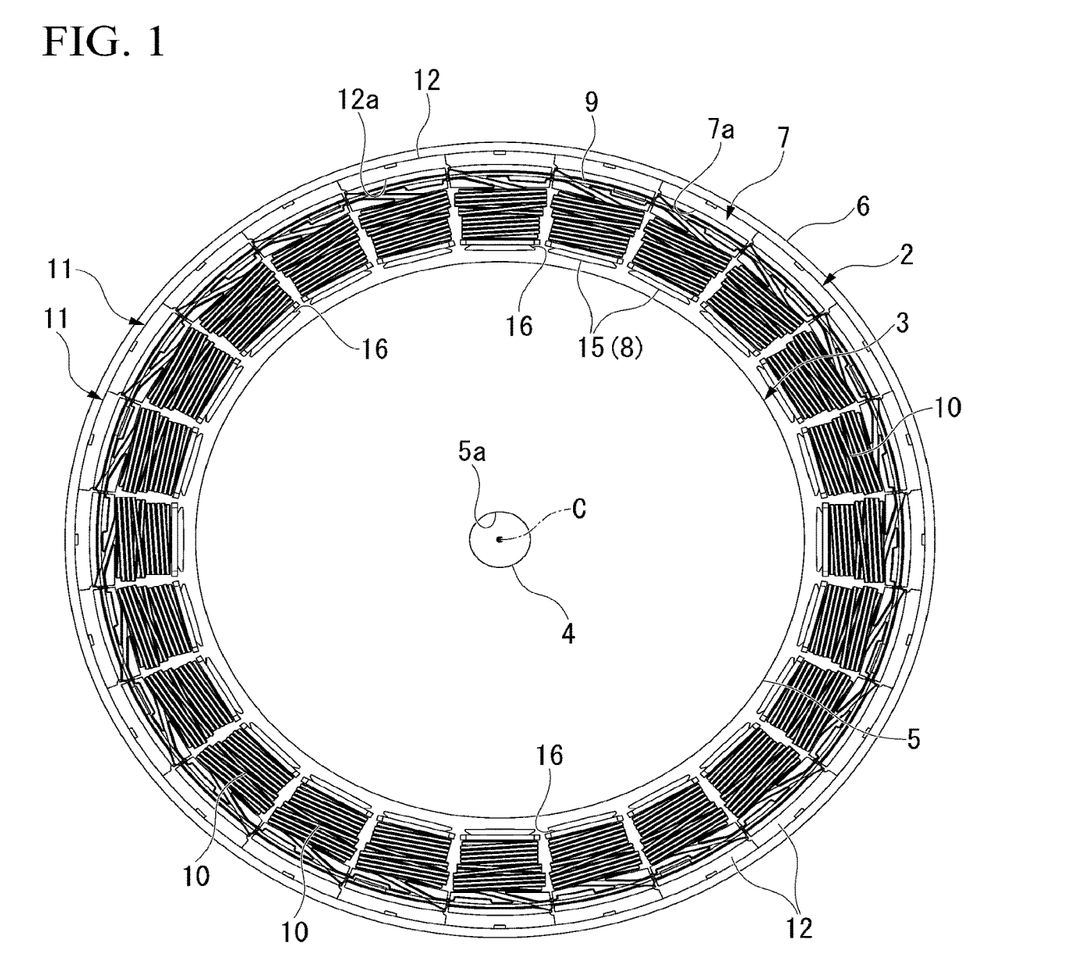
FIG. 1 is a plan view showing a rotating electric machine according to an embodiment.

FIG. 1 is a plan view showing a rotating electric machine 1.

The rotating electric machine 1 includes: a cylindrical stator 2; and a rotor 3 that is disposed in the inner side of the stator 2 in the radial direction and is rotatably provided with respect to the stator 2.

In the following description, a direction parallel to a rotation axis C of the rotor 3 is simply referred to as an axial direction, a rotation direction of the rotor 3 is simply referred to as a circumferential direction, and a radial direction of the rotor 3 orthogonal to the axial direction and the circumferential direction is simply referred to as a radial direction.

The rotor 3 includes: a shaft 4 that rotates around the rotation axis C; and a rotor core 5 that is fitted onto an outer peripheral surface of the shaft 4. A through-hole 5a that penetrates through the rotor core 5 in the axial direction is formed at a center in the radial direction of the rotor core 5. The shaft 4 is fixed to the through-hole 5a by, for example, press-fitting. A plurality of magnets which are not shown in the drawings are arranged in the circumferential direction and are provided at a position near the outer-periphery portion of the rotor core 5.

The stator 2 is fixed to and fitted into an inner peripheral surface of a cylindrical stator casing 6. The axial directions of the stator casing 6 and the stator 2 coincide with the rotation axis C. The stator 2 includes: a cylindrical stator core 7; a plurality of teeth 8 (for example, 24 in the embodiment) formed to protrude from an inner peripheral surface 7a of the stator core 7 in a radially inward direction; an insulator 9 that has insulation property and is attached so as to cover the periphery of the teeth 8; and a coil 10 wound around the insulator 9 of each of the teeth 8 by a concentrated winding method.

Here, a split core system is adopted in which the stator core 7 is separable in the circumferential direction. That is, the stator core 7 is configured such that split cores 11 separated in the circumferential direction for each of the teeth 8 are coupled in a ring form. In the embodiment, the number of the split cores 11 is twenty-four.

Figure 2:
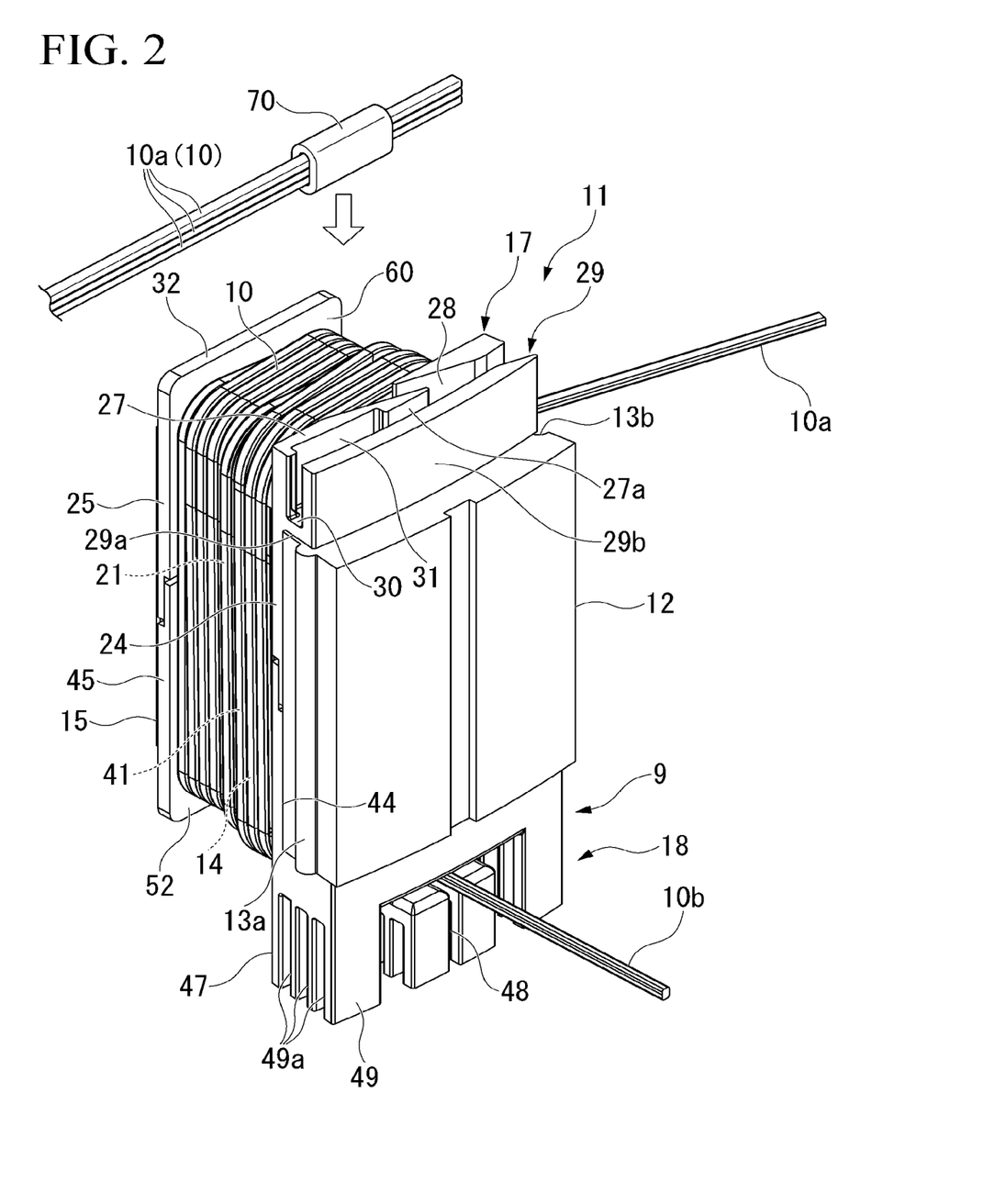
FIG. 2 is a perspective view showing a split core according to the embodiment.

FIG. 2 is a perspective view showing the split core 11.

As shown in FIGS. 1 and 2, the split core 11 is configured by, for example, stacking a plurality of metal plates in layers or pressure forming soft magnetic powder. The split core 11 includes: a split-iron core 12 extending in a circumferential direction; and the teeth 8 protruding in a radially inward direction from a center of the split-iron core 12 in the circumferential direction.

The split-iron core 12 is a portion that forms a ring-shaped magnetic path of the stator core 7 when the split cores 11 are coupled in a ring shape. The split-iron core 12 is formed such that a cross-sectional shape thereof in a direction orthogonal to the axial direction is a circular-arc shape.

Connection portions 13a and 13b are formed at both end portions of the split-iron core 12 in the circumferential direction. As shown in FIG. 1, two split-iron cores 12 adjacent to each other are coupled by the connection portions 13a and 13b. Specifically, the two split-iron cores 12 are coupled by pressing the connection portion 13a of one of the split-iron cores of the two split-iron cores 12 adjacent to each other into the connection portion 13b of the other of the split-iron cores. The connection portion 13a which is one of the two connection portions 13a and 13b is formed in a projected shape. The connection portion 13b which is the other of the two connection portions 13a and 13b is formed in a recessed shape capable of receiving the connection portion 13a.

The teeth 8 include: a teeth main body 14 that extends in the radial direction; and a flange 15. The flange 15 is located at an end portion on the inner side of the teeth main body 14 in the radial direction. The flange 15 is shaped integrally with the teeth main body 14. The flange 15 extends to both sides in the circumferential direction at an edge portion of the teeth main body 14. Consequently, a slot 16 surrounded by the teeth main body 14, the flange 15, and the split-iron core 12 is formed. That is, a pair of slots 16 disposed at both sides of the teeth 8 so as to sandwich the teeth 8 are formed at each of the split cores 11. The coil 10 is wound around the slot 16.

The insulator 9 is configured of a first insulator 17 and a second insulator 18. The first insulator 17 and the second insulator 18 are separable from or coupleable to each other in the axial direction of the teeth 8.

The first insulator 17 is attached to the teeth 8 by moving in one direction (for example, a direction from the upper side of the teeth 8 to the lower side) of the axial direction of the teeth 8.

The second insulator 18 is attached to the teeth 8 by moving in the other direction (for example, a direction from the lower side of the teeth 8 to the upper side) of the axial direction of the teeth 8.

That is, the insulator 9 has a separate configuration in which two insulators are separable in the axial direction.

In a state in which the insulator 9 is attached to the teeth 8, the first insulator 17 and the second insulator 18 overlap each other without a gap. The teeth 8 are not exposed between the first insulator 17 and the second insulator 18.

The first insulator 17 includes: a teeth cover portion 21 that covers the periphery of the teeth main body 14; an outer-wall portion 24 that is shaped integrally with an outer end of the teeth cover portion 21 in the radial direction; and an inner-wall portion 25 that is shaped integrally with an inner end of the teeth cover portion 21 in the radial direction.

The outer-wall portion 24 covers the inner side surface 12a of the split-iron core 12. The outer-wall portion 24 includes an outer-wall protruding portion 27 that protrudes from one end surface of the split-iron core 12 in the axial direction. A coil-introduction slit 28 is formed at a center of the outer-wall protruding portion 27 in the circumferential direction. The coil-introduction slit 28 is a groove that guides the coil 10 from the outer side into the inner side of the outer-wall portion 24 in the radial direction.

The coil-introduction slit 28 is formed to extend at an angle when viewed from the axial direction and to intersect with the radial direction and the circumferential direction. A coil-pressing wall 29 is formed on an outer-side surface 27a of the outer-wall protruding portion 27. The coil-pressing wall 29 houses the coil 10 (crossover wire) drawn around the outer side of the outer-wall portion 24 in the radial direction. The coil-pressing wall 29 has a bottom wall portion 29a and a side wall portion 29b. The bottom wall portion 29a protrudes from a base (a position of the outer-wall portion 24 close to one end surface of the split-iron core 12 in the axial direction) of the outer-wall protruding portion 27 in the radially outward direction. The side wall portion 29b is provided upright from an outer end of the bottom wall portion 29a in the radial direction in parallel to the outer-wall protruding portion 27.

A crossover-wire storage portion 30 (an example of a coil storage portion) that accommodates a crossover-wire portion of the coil 10 is formed of the bottom wall portion 29a, the side wall portion 29b, and the outer-wall protruding portion 27 which are mentioned above. A sleeve accommodation recess 31 (an example of a connection accommodation recess) is formed at a part of the outer-side surface 27a of the outer-wall protruding portion 27 forming the crossover-wire storage portion 30. The sleeve accommodation recess 31 is disposed so as to avoid the coil-introduction slit 28. The sleeve accommodation recess 31 is formed in a quadrangular shape when viewed from the axial direction. The sleeve accommodation recess 31 accommodates a metal sleeve 70 described below.

The inner-wall portion 25 covers an inner-side surface (outer side surface in the radial direction) of the flange portion 15 forming the teeth 8. The inner-wall portion 25 includes an inner-wall protruding portion 32 that protrudes from one end surface of the flange 15 in the axial direction. A protruding height of the inner-wall protruding portion 32 protruding from the flange portion 15 is substantially the same as a protruding height of the outer-wall protruding portion 27 protruding from the split-iron core 12.

The second insulator 18 includes: a teeth cover portion 41 that covers the periphery of the teeth main body 14; an outer-wall portion 44 that is shaped integrally with an outer end of the teeth cover portion 41 in the radial direction; and an inner-wall portion 45 that is shaped integrally with an inner end of the teeth cover portion 41 in the radial direction.

The outer-wall portion 44 covers the inner side surface 12a of the split-iron core 12.

The outer-wall portion 44 includes an outer-wall protruding portion 47 that protrudes from the other end surface of the split-iron core 12 in the axial direction. A coil-drawing slit 48 is formed at a center of the outer-wall protruding portion 47 in the circumferential direction. The coil 10 wound around the insulator 9 is drawn out through the coil-drawing slit 48.

The coil-guide portion 49 is formed on an outer-side surface 47a of the outer-wall protruding portion 47. The coil-guide portion 49 houses the coil 10 (crossover wire) drawn around the outer side of the outer-wall portion 44 in the radial direction. The coil-guide portion 49 includes a plurality of guide grooves 49a (for example, three in the embodiment) extending in the circumferential direction. The three guide grooves 49a are arranged in parallel in the radial direction. Each of the three guide grooves 49a corresponds to U-phase, V-phase, and W-phase. A U-phase coil 10 is accommodated in a U-phase guide groove 49a. A V-phase coil 10 is accommodated in a V-phase guide groove 49a. A W-phase coil 10 is accommodated in a W-phase guide groove 49a.

The inner-wall portion 45 covers an inner-side surface (outer side surface in the radial direction) of the flange portion 15 forming the teeth 8. The inner-wall portion 45 includes an inner-wall protruding portion 52 that protrudes from an end surface of the flange portion 15 in the axial direction. A protruding height of the inner-wall protruding portion 52 protruding from the flange portion 15 is lower than a protruding height of the outer-wall protruding portion 47 protruding from the split-iron core 12.

In the foregoing configuration, the first insulator 17 and the second insulator 18 are attached to both ends of the teeth 8 in the axial direction. A coil-winding-accommodating recess portion 60 is formed of the teeth cover portions 21 and 41, the outer-wall portions 24 and 44, and the inner-wall portions 25 and 45 which constitute the first insulator 17 and the second insulator 18. The coil 10 is wound around the insulator 9 attached to the teeth 8 by a concentrated winding method so as to be accommodated in the coil-winding-accommodating recess portion 60.

A step of winding the coil 10 around the insulator 9 attached to the teeth 8 will be particularly described below.

The coil 10 is firstly wound around the first insulator 17 (start of winding). After the winding of the coil 10 with respect to the teeth 8 is completed, a winding-completion end of the coil 10 is drawn out from the second insulator 18. The coil 10 is a so-called rectangular wire having a rectangular cross-sectional shape. The above-described coil 10 of the rectangular wire is wound and aligned without a gap such that a longitudinal direction thereof is along the radial direction and a short-side direction thereof is along the circumferential direction.

Terminal portions of the coils 10, each of which is wound around each of the teeth 8 and drawn out from both ends of each split core 11 in the axial direction, are connected to each other. In the embodiment, the rotating electric machine 1 is configured of coils with three phases (U-phase, V-phase, and W-phase), and the coils 10 are star-connected (Y-connection). For example, a terminal portion 10a (refer to FIG. 2, winding-start end) of the coil 10 drawn out through the coil-introduction slit 28 of the first insulator 17 is connected to a neutral point. A terminal portion 10b (refer to FIG. 2, winding-completion end) of the coil 10 drawn out through the coil-drawing slit 48 of the second insulator 18 is connected to a terminal, which is not shown in the drawings, with a phase corresponding to the same phase coils connected to each other.

The terminal portion 10b (winding-completion end) of the coil 10 connected to the terminal, which is not shown in the drawings, and the terminal portion 10a (winding-start end) of the coil 10 connected to the neutral point are separately arranged at both sides of the stator core 7 in the axial direction. The terminal portions 10a of the coils 10 connected to the neutral point are pressure-bonded by the metal sleeve 70 (refer to FIG. 2) such that, for example, three coils form one bundle. In this state, the terminal portions 10a of the coils 10 are accommodated in the crossover-wire storage portion 30 of the first insulator 17 and are drawn thereto. The metal sleeve 70 is accommodated in the sleeve accommodation recess 31 of the first insulator 17.

On the other hand, the terminal portion 10b of the coil 10 connected to the terminal, which is not shown in the drawings, is accommodated in each guide groove 49a of the second insulator 18. That is, the coils 10 with the U-phase, the V-phase, and the W-phase are accommodated in the guide grooves 49a with the U-phase, the V-phase, and the W-phase, and are drawn thereto, respectively.

When electric power is supplied to a desired coil 10 via the terminals, which are not shown in the drawings, a desired interlinkage magnetic flux is formed in the stator 2. A magnetic suction force or a magnetic repulsion force is generated between the interlinkage magnetic flux and a magnet of the rotor 3, which is not shown in the drawings, and the rotor 3 rotates.

In addition, in a case in which the rotating electric machine 1 is used as a power generator, when the rotor 3 rotates due to an external force or the like, a magnetic suction force or a magnetic repulsion force is generated between a magnet of the rotor 3, which is not shown in the drawings, and the coil 10 of the stator 2, and an interlinkage magnetic flux is generated. Consequently, electric power is generated from the terminals, which are not shown in the drawings.

Here, a method of connecting the terminal portions 10a of the coils 10 serving as the neutral point by use of the metal sleeve 70 will described in detail with reference to FIGS. 2 to 4.

Figure 3:
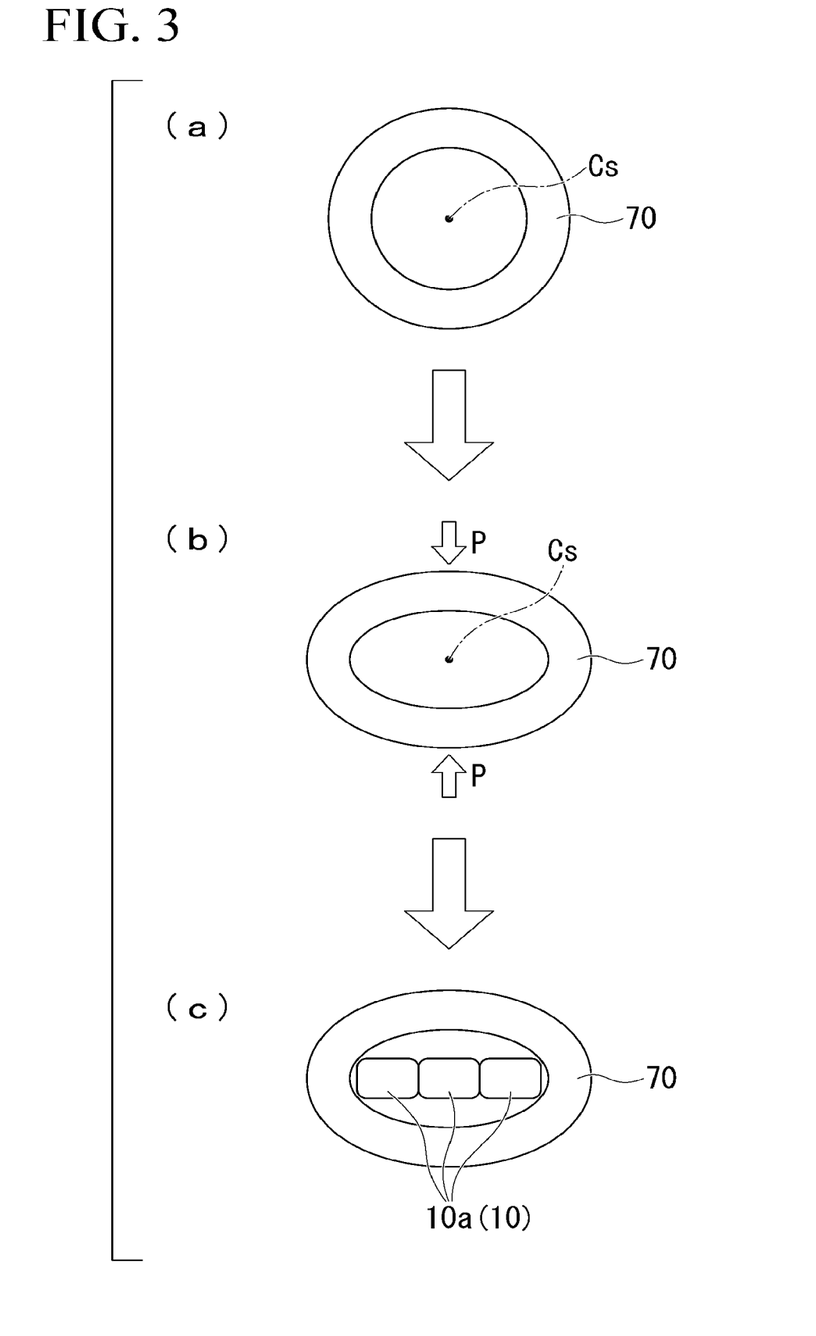
FIG. 3 is an explanatory diagram of a method of connecting a coil according to the embodiment and is a schematic cross-sectional view showing a metal sleeve.

FIG. 3 is an explanatory diagram of a method of connecting the terminal portions 10a of the coils 10 by use of the metal sleeve 70. In FIG. 3, each of PART (a) to (c) shows a step.

As shown in FIG. 3 (*a*), the metal sleeve 70 before being pressure-bonded is formed in a round tube shape. That is, when viewed from the axial direction of the metal sleeve 70, the metal sleeve 70 having a circular shape is prepared.

As shown in FIG. 3 (*b*), both sides of the round-tube shaped metal sleeve 70 are pressed so as to sandwich an axis center Cs of the metal sleeve 70 (refer to reference letter P of FIG. 3 (*b*)). Consequently, the metal sleeve 70 is deformed in an elliptical shape when viewed from the direction of the axis center Cs (sleeve-processing step). That is, the metal sleeve 70 is processed such that the metal sleeve 70 has a non-circular shape when viewed from the axial direction, and the deformed metal sleeve 70 is obtained. The post-deformed (post-processed) metal sleeve may be referred to as a "deformed sleeve" or "deformed metal sleeve".

Next, as shown in FIG. 3 (*c*), the terminal portions 10*a* of the coils 10 are inserted into the deformed metal sleeve 70 formed in an elliptical shape (coil insertion step).

In the aforementioned sleeve-processing step, the metal sleeve 70 is deformed in an elliptical shape such that a predetermined number (for example, three in the embodiment) of the coils 10 are aligned inside the metal sleeve 70 side by side. Accordingly, the terminal portions 10*a* of the coils 10 are aligned side by side by inserting the terminal portions 10*a* of the coils 10 into the metal sleeve 70 in the coil insertion step. For example, since the coil 10 is a rectangular wire in the embodiment, the coil 10 has a longitudinal direction and a short-side direction in cross-sectional view of the coil 10. As shown in FIG. 3 (*c*), the three coils 10 are laterally arranged in the longitudinal direction of the coil 10 in the deformed metal sleeve 70.

Next, after the three coils are inserted into the deformed metal sleeve 70, the deformed metal sleeve 70 is connected to the terminal portion 10*a* of each of the coils 10 by swaging the metal sleeve 70 (swaging step).

Figure 4:
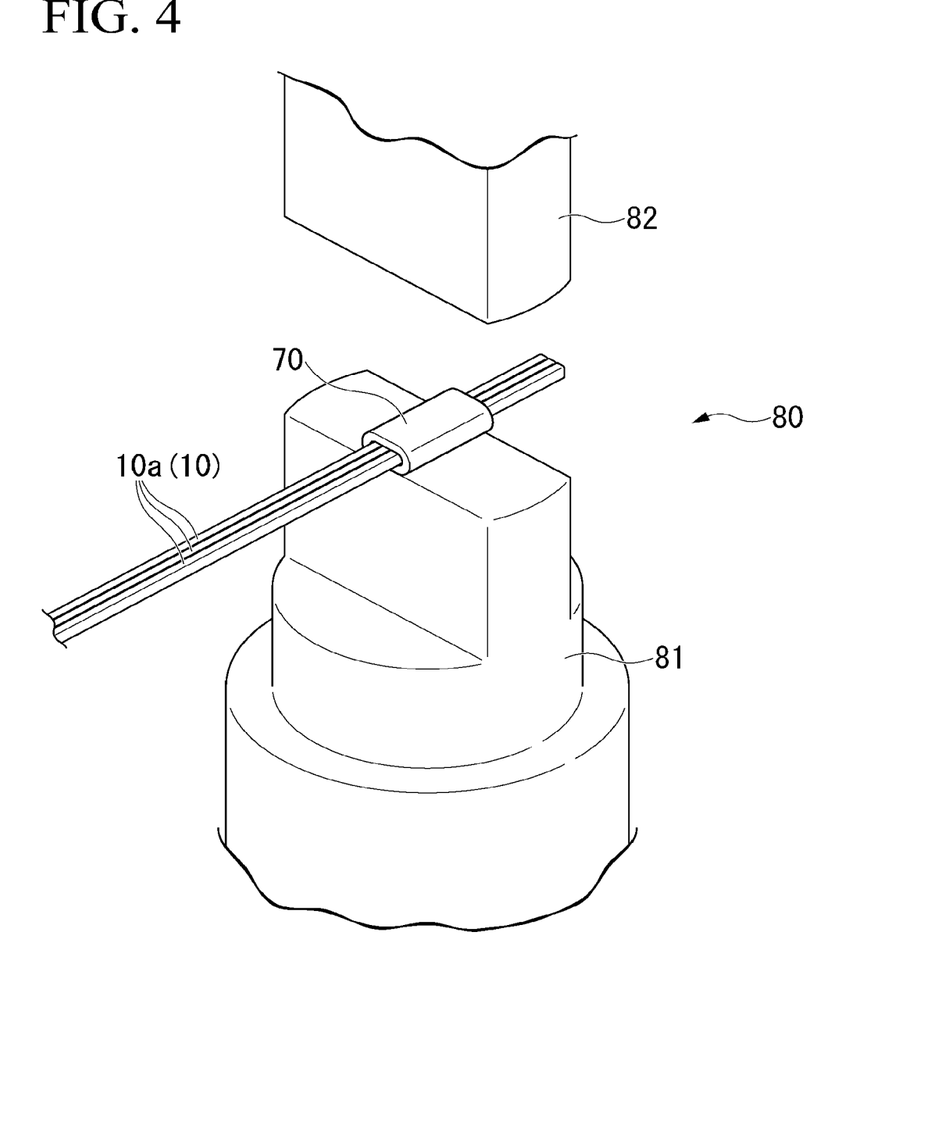
FIG. 4 is a perspective view showing a pressure joining apparatus according to the embodiment.

FIG. 4 is a perspective view showing a pressure joining apparatus 80 for carrying out the swaging step.

As shown in FIG. 4, the pressure joining apparatus 80 includes a fixed electrode 81 and a movable electrode 82 that approaches or moves separately with respect to the fixed electrode 81. The metal sleeve 70 into which the terminal portions 10*a* of the coils 10 are inserted is disposed on the fixed electrode 81 of such a pressure joining apparatus 80. At this time, the movable electrode 82 is arranged separately from the fixed electrode 81. Thereafter, the movable electrode 82 comes close to the fixed electrode 81 and the metal sleeve 70 is pressurized. At this time, electric power is provided to each of the electrodes 81 and 82.

For example, in the case of connecting the three coils 10 to each other by the metal sleeve 70, a pressurizing condition with respect to the metal sleeve 70 and an energizing condition with respect to each of the electrodes 81 and 82 are, for example, as follows.

Pressing force applied to the metal sleeve 70: 3000 [N]
Method of energizing each of the electrodes 81 and 82:
PWM (Pulse Width Modulation)
control (pulse energization control)
Flowing current: 10 [kA]
Energization cycle: 8 times
Starting-up time of energization: 50 [ms]
Energization time: 600 [ms]

Electrification and pressurization are carried out on the metal sleeve 70 under the above-mentioned conditions using the pressure joining apparatus 80. Accordingly, the metal sleeve 70 is swaged, and the metal sleeve 70 is reliably connected to the coils 10. In this manner, the connection step of the terminal portions 10*a* of the coils 10 using the metal sleeve 70 is completed. The shape of the swaged metal sleeve 70 is a flat shape. The metal sleeve 70 in this state is accommodated in the sleeve accommodation recess 31 of the first insulator 17 as shown in FIG. 2. When viewed from the axial direction, the sleeve accommodation recess 31 is formed in a quadrangular shape so as to correspond to the shape of the swaged metal sleeve 70.

Note that, in the sleeve-processing step, the electrodes 81 and 82 may be subjected to press working in a state in which electric power is not provided to each of the electrodes 81 and 82 of the pressure joining apparatus 80. Conditions of the press working are not particularly limited, and known press working conditions are used.

As remarked above, in the embodiment, when the terminal portions 10*a* of the coils 10 are connected, connection of the coils 10 can be easily carried out using the metal sleeve 70.

Moreover, the above-described method of connecting the coil 10 includes the sleeve-processing step, the coil insertion step, and the swaging step. Accordingly, it is possible to easily align the terminal portions 10*a* of the coils 10 side by side by inserting the terminal portions 10*a* of the coils 10 into the metal sleeve 70 in the coil insertion step. Therefore, it is possible to improve workability of an operation of connecting the coils 10.

Furthermore, electrical heating is carried out on the metal sleeve 70 by pulse energization control in the swaging step. Consequently, the metal sleeve 70 is reliably connected to the coils 10, and removal of the coils 10 from the metal sleeve 70 or burnout of the coils 10 can be prevented.

Additionally, in the aforementioned embodiment, the crossover-wire storage portion 30 is formed in the first insulator 17 that covers the teeth 8. Moreover, the sleeve accommodation recess 31 is formed on a part of the outer side surface 27*a* of the outer-wall protruding portion 27 forming the crossover-wire storage portion 30. The metal sleeve 70 to which the coils 10 are connected is accommodated in the sleeve accommodation recess 31. Therefore, the position of the metal sleeve 70 can be easily stabilized. Furthermore, a space of the crossover-wire storage portion 30 is effectively utilized, and the metal sleeve 70 can be arranged therein. Thus, it is possible to prevent the stator 2 from being unnecessarily larger in size.

According to at least one embodiment described above, the method of connecting the coil 10 includes the sleeve-processing step, the coil insertion step, and the swaging step. Accordingly, it is possible to easily align the terminal portions 10*a* of the coils 10 side by side by inserting the terminal portions 10*a* of the coils 10 into the metal sleeve 70 in the coil insertion step. Therefore, it is possible to improve workability of an operation of connecting the coils 10.

Note that, in the above-mentioned embodiment, a case was described in which the stator 2 (stator core 7) is configured such that the split cores 11 are coupled in a ring form. A case was described in which the number of the split cores 11 is twenty-four. However, the embodiment is not limited to this configuration. A split core system separable in the circumferential direction may not be applied to the stator 2 (stator core 7).

In the above-described embodiment, a case was described in which, for example, the terminal portions 10*a* of the three coils 10 are connected by use of the metal sleeve 70. However, the embodiment is not limited to this configuration. The number of the coils 10 can be optionally determined. That is, the number of the coils 10 may be greater than or equal to four. The size of the metal sleeve 70 needs to be changed depending on the number of the coils 10 to be connected. Furthermore, in the sleeve-processing step, the metal sleeve 70 may not be deformed in an elliptical shape when viewed from the direction of the axis center Cs, and the metal sleeve 70 needs to be deformed depending on the arrangement in which the coils 10 are aligned. The shape of the metal sleeve 70 before being deformed is a circular shape when viewed from the axial direction. The shape of the post-deformed metal sleeve 70 needs to be a shape (different shape) other than a circular shape.

In the aforementioned embodiment, a case was described in which the terminal portions 10*a* (neutral point) of the coils 10 are connected by use of the metal sleeve 70. However, the embodiment is not limited to this configuration. Even in a case of connecting the terminal portion 10*b* of the coil 10 to a terminal which is not shown in the drawings, the above-mentioned method of connecting the coil 10 can be adopted.

In the above-described embodiment, a case was described in which the sleeve accommodation recess 31 is formed in the insulator 9 (first insulator 17), and the metal sleeve 70 to which the coil 10 is connected is accommodated in the sleeve accommodation recess 31. However, the embodiment is not limited to this configuration. A member that connects the terminal portions 10*a* of the coils 10 may be used instead of the metal sleeve 70. Additionally, the terminal portions 10*a* of the coils 10 may be directly connected by welding or the like. In such cases described above, the sleeve accommodation recess 31 needs to be formed so as to be able to accommodate the connection point of the coils 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the inventions. The accompanying claims and their equivalents are intended to cover such forms or modifications as would fall within the scope of the inventions.

DESCRIPTION OF REFERENCE NUMERALS

1 . . . rotating electric machine, 2 . . . stator, 3 . . . rotor, 7 . . . stator core, 8 . . . teeth, 9 . . . insulator, 10 . . . coil, 17 . . . first insulator, 18 . . . second insulator, 21, 41 . . . teeth cover portion, 30 . . . crossover-wire storage portion (coil storage portion), 31 . . . sleeve accommodation recess (connection accommodation recess), 70 . . . metal sleeve, 80 . . . pressure joining apparatus

The invention claimed is:

1. An insulator to be attached to teeth extending from one side surface in a radial direction of a ring-shaped stator core in the radial direction, the insulator ensuring insulation between the teeth and a coil wound around the teeth, the insulator comprising:
   a teeth cover portion that covers a periphery of the teeth;
   a coil storage portion that is provided at one end of the teeth cover portion in an axial direction and that accommodates the coil; and
   a wall portion provided between the teeth cover portion and the coil storage portion in the radial direction, wherein
   the coil storage portion includes a connection accommodation recess that accommodates a connection portion having a plurality of coils bundled together and bonded,
   the connection accommodation recess is separated from the teeth cover portion by the wall portion,
   the wall portion has a coil-introduction slit, and
   the coil-introduction slit guides the coil from the coil storage portion to the teeth cover portion.

2. The insulator according to claim 1, wherein the connection portion includes a metal sleeve.

3. A stator comprising:
   the insulator according to claim 1;
   the teeth to which the insulator is attached; and
   the stator core combined with the teeth.

4. A rotating electric machine, comprising:
   the stator according to claim 3; and
   a rotor rotatably disposed with respect to the stator.

* * * * *